Aug. 18, 1970   M. MAULINI   3,525,097
APPARATUS FOR SEPARATING ROWS OF ARTICLES ON A
CONVEYOR INTO BATCHES
Filed March 25, 1968
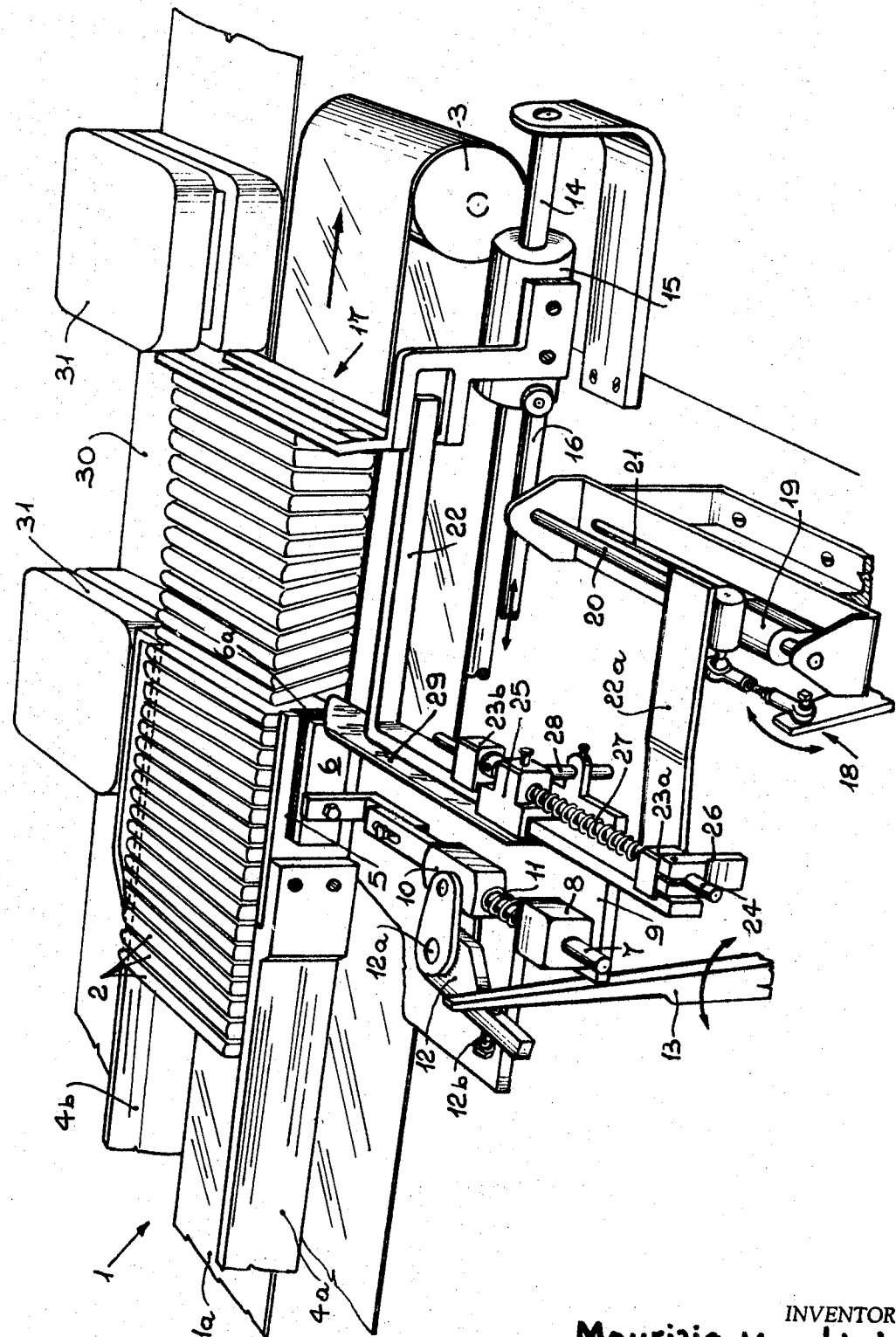
INVENTOR.
Maurizio Maulini
BY

United States Patent Office 3,525,097
Patented Aug. 18, 1970

3,525,097
APPARATUS FOR SEPARATING ROWS OF ARTICLES ON A CONVEYOR INTO BATCHES
Maurizio Maulini, Bologna, Italy, assignor to Azionaria Costruzioni Macchine Automatiche, A.C.M.A., S.p.A., Bologna, Italy, a corporation of Italy
Filed Mar. 25, 1968, Ser. No. 715,777
Claims priority, application Italy, Mar. 25, 1967, 1,587/67
Int. Cl. B65g 47/00
U.S. Cl. 198—24         4 Claims

ABSTRACT OF THE DISCLOSURE

An apparatus for separating in succession groups of articles from a leading end of a travelling row of such articles stacked face to face, particularly thin flat articles such as biscuits standing on edge and for transferring such articles therefrom, the apparatus including a first conveyor for moving the row of articles in an advancing direction, a movable support member for supporting the leading end of said row of articles abutting thereagainst, a second conveyor arranged alongside of said first conveyor along at least a length thereof and a transverse pusher member for transferring at least one article at the leading end of said row of articles from said first conveyor onto said second conveyor.

---

This invention relates to an apparatus associated to an operative station of an automatic packaging machine, and, more particularly concerns an apparatus which is fed in practically continuous manner with a row of substantially plate-like articles, for example biscuits, and in which groups of preestablished length or number of such articles are separated from said row and are subsequently removed by means designed to convey said groups of products to successive stations such as packing and boxing stations.

In the known machines, according to whether the feeding is vertical or horizontal, the apparatuses adapted to effect the above indicated operations, are produced in different manner. However, in the known apparatuses, it usually occurs that, upon reaching, or at the opening of apertures provided in the bounding and guide walls for the flow of products, corresponding pushers are actuated which are designed to remove the quantities of articles which are able to pass through the passages defined by such apertures.

Now such combinations of stops, apertures (open or openable), and pushers, employed in the known apparatuses, determine systems of fixed stops and compulsory passages. Consequently, in order to have an efficient and such working, it is necessary to have strict tolerances in the various products and in the relative thickness quotas, and this especially so when it is desired to remove a notable number of pieces from the feed row.

Since, in fact, there is usually no provision for a clean separation and distinction of the group of objects to be removed from the file before such removal, due to variations of thickness it is possible that some of the product may be in the zone provided for the relative sliding of the group of articles with respect to said row, so that the package of the piece and, consequently, jamming in the production cycle may occur.

SUMMARY OF THE INVENTION

The main object of the present invention is that of avoiding such type of inconveniences by providing an apparatus designed in manner such that the separation of groups of predetermined development from the respective feed lines is preceded by a preventive separation of the group from the relative row, without necessitating undue forcings of the products through compulsory passages dimensioned in accordance with the length of the group or batch of objects to be removed.

Another object of the invention is that of providing an apparatus having considerable flexibility of use so as to be able to operate in combination with different types of product, said apparatus being especially suitable for biscuit packaging machines.

A further object of the invention is that of providing an apparatus of the described type, which has a structure which is simple, of ready production, and of sure and efficient working, besides operating in sufficiently rapid manner.

These and other objects, which will better appear hereinafter, are achieved by an apparatus comprising a belt conveyor on which the row of articles is placed, a braking member suitable to stop a trailing portion of the row of articles, while allowing the belt conveyor to continue its movement and to entrain a leading end group of articles, a support member for the leading end of the row and which is movable in unison with the belt conveyor and stops the leading end group of articles shortly after the braking member has stopped the trailing portion of the row, thereby spacing the leading end group of articles from the trailing portion of the row for a short distance and a pusher which pushes the leading end group of articles in a direction transverse to the belt conveyor away therefrom onto a second belt conveyor arranged alongside, when the spaced leading end group of articels has been stopped by the support member.

BRIEF DESCRIPTION OF THE DRAWING

Further characteristics and advantages of the invention will appear more clearly from the following detailed description of a preferred embodiment of the apparatus according to the invention illustrated by way of example in the accompanying drawing, which shows a partially sectioned perspective view of the apparatus.

DESCRIPTION OF PREFERRED EMBODIMENTS

With particular reference to the figure, the reference numeral 1 indicates one of the feed lines which continuously conveys a row of products 2 of prismatic form. Said products 2 may be box-like or plate-like, for instance biscuits, which stacked face to face and standing on edge support one another.

Said feed line 1 comprises a belt conveyor 1a which is arranged to travel with continuous motion in substantially horizontal planes and in the direction indicated by the vector in the figure. Said belt conveyor 1a is wound on relative pulleys of which the downstream pulley is indicated with reference numeral 3.

Right and left walls or guides 4a and 4b respectively, laterally bound the upper branch of said belt 1 and extend to a point almost adjacent the end of such branch. The walls 4a and 4b thus form a guide for the row of products conveyed by said belt 1.

In the terminal part of the guide 4a, adjacent the outlet of the feed line 1, there is produced a slot 5 through which passes a braking buffer 6, provided with a respective gasket 6a.

A bent lever 7a adjustable connects said buffer 6 to one of the end portions of a rod 7, whose other end is guided in a block 8 fast with members 9, provided on the framework of the machine. With the due play between said block 8 and a stop member provided on said rod 7, a block member 10 is mounted on the rod 7.

A spring 11, interposed between said blocks 8 and 10 urges said braking or buffer member 6 against the products, causing a clamping of the latter against the guide 4b.

The fork of a bent lever 12, fulcrumed with axis vertical in 12a to the frame-work 9, engages said block 10, while a screw adjustable stop member 12b, provided on the other arm of said lever 12, remains actuated, during the braking stage, by a rocking lever 13.

On a rod member 14, supported parallel to and to the right of said belt conveyor 1a, is mounted a sleeve sliding member 15 which is actuated by a linkage 16 (only partially shown in the figure).

To said slider sleeve 15 is connected an L-shaped arm 17, which has a fork-like form with two tines and whose longitudinal axis lays in a vertical plane. A first portion of said arm 17 extends in the direction of said belt 1a and a second section is arranged transversely to said belt. The concavity of said arm 17 is directed downstream and forms a reciprocating front in front of said outlet of the belt conveyor 1a.

A linkage 18 actuates a slider 19 which is mounted on a rod 20, orthogonal to said rod 14 and parallel to said rod 7, and is guided in a eyelet 21 provided in the support for said rod 20.

Fast with said slider 19 is arranged a support 22a for a bent lever 22.

One side of said bent lever 22 is transverse with respect to the axial development (direction of the belt 1a), while the pushing arm is parallel to said belt 1a and is movably engaged between the prongs or tines of said fork 17.

On said transverse side of the lever 22, are rigidly mounted a pair of blocks 23a and 23b through which a rod 24 passes. Between said blocks 23a and 23b, and on the rod 24, is mounted and fixed the slider 25 which is prismatically coupled on said side upstream of said lever 22.

At the end of said rod 24 which passes beyond said block 23a is fixed a stop member 26. Between the block 23a and said slider 25 is interposed a spring 27 which is mounted on said rod 24. Said spring 27 tends to urge said slider 25 away from said block 23a. The end of said stop member 26, during the forward motion of the lever 22 cooperates with the rod 28.

Rigidly mounted on said slider 25 is a blade separator member 29 which is arranged parallel to said transverse side of the lever 22.

The final zone of the feed line 1 is arranged in side-by-side relationship with the branch of a belt 30 designed to convey the groups of product separated by the separation unit which will now be described. Said belt 30, which travels step-wise, is peripherally provided with blocks 31, which bound the seats or pockets designed to receive said groups of product.

On the other side of said belt 30 there is provided a second product feed line, whose separation unit works in a offset position with respect to the separation unit of the feed line 1. In this manner two successive feed pockets of the conveyor 30 are simultaneously filled and, consequently, said conveyor 30 travels, during the advancement phase, a distance corresponding to two feed pockets.

The working of the separation unit and of the relative operative station will be clear and intuitive from the detailed description made.

In its retracted end of stroke position the front or support member 17 is arranged to close the outlet for the products on the feed line 1 the leading end abutting against the support member. During the displacement of said front 17 downstream, the products, carried by the belt 1a, are correspondingly carried downstream. During a pause in the front 17, slightly before its extending end of stroke position the braking buffer 6 acts on the products, so that the flow is stopped, the belt 1a sliding beneath the products.

The products of the leading end group gather one against the other the leading end abutting against the member 17, which has reached its forward or extended stroke end, there remaining a gap between the leading end group of articles removed and the outlet of the line 1a, i.e. remaining articles of the row. In such space or gap the blade 29 is inserted, which is initially actuated by the pusher 22, which continuing its forward stroke, pushes the group of products into the feed pocket of the conveyor 30 situated in front thereof, while the blade 29 stops in retracted position due to the engagement of the stop member 26 with said rod 28.

The initial situation is then reached again and the brake is freed.

I claim:

1. An apparatus for separating in succession groups of articles from a leading end of a travelling row of such articles stacked face to face, particularly thin flat articles such as biscuits standing on edge and for transferring such articles therefrom, the apparatus including a first conveyor for moving the row of articles in an advancing direction, a movable support member for supporting the leading end of said row of articles abutting thereagainst, a second conveyor arranged alongside of said first conveyor along at least a length thereof and a transverse pusher member for transferring at least one article at the leading end of said row of articles from said first conveyor onto said second conveyor, means for actuating in coordination the operating members of the apparatus, including a transmission mechanism transmitting a reciprocating movement to said support member in the direction of said first conveyor, said reciprocating movement defining a stroke of said support member, having a retracted end of stroke position of said support member and spaced therefrom, in the advancing direction of said first conveyor an extended end of stroke position of said support member, during the forward stroke said support member moving in unison with said belt conveyor, and wherein, according to the improvement, said first conveyor is arranged to extend beyond said movable support member in the advancing direction of the articles thereby allowing the entire row of articles, the leading end thereof included, to rest on said first conveyor and wherein the apparatus further comprises a braking member behind said retracted end of stroke position in respect to the advancing direction of said belt conveyor, said braking member being arranged to stop the row of articles behind said retracted end of stroke position shortly before said support member reaches its extended end of stroke position while the conveyor continues to move beneath the articles thereby causing a further advancement of the leading end group of articles situated in the advancing direction beyond said braking member, and wherein said pusher member has actuated transmission means actuating said pusher member in a transverse direction relative to said first conveyor to transfer said leading end group of articles spaced from the stopped row portion of articles from said first conveyor onto said second conveyor, when said support member has reached its extending end of stroke position.

2. An apparatus according to claim 1, wherein said pusher member has a separator guiding blade cooperating therewith adapted to be inserted in the space formed between the leading end group of articles and the remaining articles of the row when said pusher member is actuated and to guide said leading end group of articles toward said second conveyor.

3. An apparatus according to claim 1, wherein said support member comprises a fork member having two vertically spaced L-shaped tines, one section of the L-shape of the tines extending transverse to said first conveyor belt and the other section of said L-shape extending in the direction of said first conveyor and wherein said pusher member has a rod member having transverse dimensions allowing free passage thereof through the gap between said vertically spaced tines.

4. A method for separating in successions groups of articles from a leading end of a travelling row of such articles stacked face to face, particularly thin flat articles, such as biscuits standing on edge and for transferring such articles therefrom, which comprises placing the row of articles on a movable conveyor, abutting the leading end of the row of articles against a support member, moving said support member in the feed direction of the conveyor in unison therewith thereby allowing said row of articles to be entrained by said conveyor in the feed direction thereof in unison with said support member, stopping a portion of the moving row of articles, behind a leading end group of articles of the row while allowing said conveyor to continue to move beneath said stopped portion of the row and to continue to entrain the leading end group of the articles, stopping said support member shortly after the leading end group of articles has been spaced from said stopped portion of the row to form a narrow gap therebetween and pushing said leading end group of articles in a direction transverse to said row away from said conveyor.

References Cited

UNITED STATES PATENTS

| | | | |
|---|---|---|---|
| 2,907,155 | 10/1959 | Engleson | 198—24 |
| 2,954,881 | 10/1960 | Hopton | 198—24 |
| 3,013,647 | 12/1961 | Gilbert | 198—24 |

FOREIGN PATENTS 172,228  12/1965  Russia.

RICHARD E. AEGERTER, Primary Examiner

U.S. Cl. X.R.

53—164, 252